(12) United States Patent
Peltier et al.

(10) Patent No.: US 11,092,185 B2
(45) Date of Patent: Aug. 17, 2021

(54) SHEARABLE FASTENER BOLT AND METHOD FOR CLAMPING ELECTRIC WIRES, AND ELECTRICAL CONNECTOR COMPRISING A ZERO-PROTRUSION SHEARABLE FASTENER

(71) Applicant: Tyco Electronics Simel SAS, Gevrey-Chambertin (FR)

(72) Inventors: Bruno Peltier, St. Apollinaire (FR); Julien Dossmann, Gevrey-Chambertin (FR)

(73) Assignee: Tyco Electronics Simel SAS, Gevrey-Chambertin (FR)

( * ) Notice: Subject to any disclaimer, the term of this patent is extended or adjusted under 35 U.S.C. 154(b) by 0 days.

(21) Appl. No.: 16/599,743

(22) Filed: Oct. 11, 2019

(65) Prior Publication Data
US 2020/0040930 A1 Feb. 6, 2020

Related U.S. Application Data

(63) Continuation of application No. PCT/EP2018/059467, filed on Apr. 12, 2018.

(30) Foreign Application Priority Data

Apr. 13, 2017 (EP) .................................. 17305443

(51) Int. Cl.
*F16B 31/00* (2006.01)
*F16B 35/00* (2006.01)
(Continued)

(52) U.S. Cl.
CPC .......... *F16B 31/021* (2013.01); *F16B 35/005* (2013.01); *H01R 4/36* (2013.01)

(58) Field of Classification Search
CPC ......... F16B 31/021; F16B 35/005; H01R 4/36
(Continued)

(56) References Cited

U.S. PATENT DOCUMENTS 3,444,775 A * 5/1969 Hills .................... F16B 31/021
411/5
6,209,424 B1 * 4/2001 Croton .................. F16B 31/021
81/119
(Continued)

FOREIGN PATENT DOCUMENTS

CN 1179815 A 4/1998
EP 1460278 A1 9/2004
(Continued)

OTHER PUBLICATIONS

Abstract of EP 1911981, dated Apr. 16, 2008, 2 pages.
(Continued)

*Primary Examiner* — Flemming Saether
(74) *Attorney, Agent, or Firm* — Barley Snyder

(57) ABSTRACT

A fastener bolt for clamping an electric wire includes a bolt part and a nut part. The bolt part has a head section, a thread section, and a shearing section connecting the head section and the thread section. The nut part is screwed onto the thread section. The shearing section is configured to break if a predetermined fastening torque is exceeded. The thread section is hollow and has a predetermined tensile breaking strength.

9 Claims, 4 Drawing Sheets

(51) Int. Cl.
*F16B 31/02* (2006.01)
*H01R 4/36* (2006.01)

(58) Field of Classification Search
USPC .............................................. 411/2, 3, 5, 393
See application file for complete search history.

(56) References Cited

U.S. PATENT DOCUMENTS

| | | | |
|---|---|---|---|
| 6,321,624 B1 | 11/2001 | Croton et al. | |
| 7,214,108 B2* | 5/2007 | Barnett ................. | F16B 31/021 |
| | | | 439/797 |
| 8,425,265 B2* | 4/2013 | Stauch ................... | H01R 4/363 |
| | | | 439/814 |
| 9,366,282 B2* | 6/2016 | Vallette .................. | F16B 31/02 |
| 2012/0202393 A1 | 8/2012 | Stauch et al. | |
| 2015/0071728 A1 | 3/2015 | Vallette et al. | |
| 2019/0165497 A1* | 5/2019 | Toivanen ............... | H01R 43/00 |
| 2019/0285107 A1* | 9/2019 | Veerapathiran .......... | H01R 4/36 |

FOREIGN PATENT DOCUMENTS

| | | | |
|---|---|---|---|
| EP | 1911981 | A2 | 4/2008 |
| EP | 2322816 | A1 | 5/2011 |
| EP | 2498339 | A1 | 9/2012 |
| EP | 2657548 | A2 | 10/2013 |
| EP | 2846052 | A1 | 3/2015 |
| EP | 2999053 | A1 | 3/2016 |
| GB | 2299640 | A | 10/1996 |
| WO | 2013165955 | A1 | 11/2013 |

OTHER PUBLICATIONS

PCT International Search Report and the Written Opinion of the International Searching Authority, International Application No. PCT/EP2018/059467, dated Jun. 20, 2018, 14 pages.
Abstract of EP1460278, dated Sep. 22, 2004, 2 pages.
Abstract of EP2322816, dated May 18, 2011, 2 pages.
Abstract of EP2657548, dated Oct. 30, 2013, 2 pages.
Abstract of EP2498339, dated Sep. 12, 2012, 2 pages.
First Office Action from the CNIPA, dated Sep. 15, 2020 and English translation thereof, 24 pp.
Abstract of CN1628221(A), dated Jun. 15, 2005, 1p.
Abstract of CN102760978(A), dated Oct. 31, 2012, 1p.

* cited by examiner

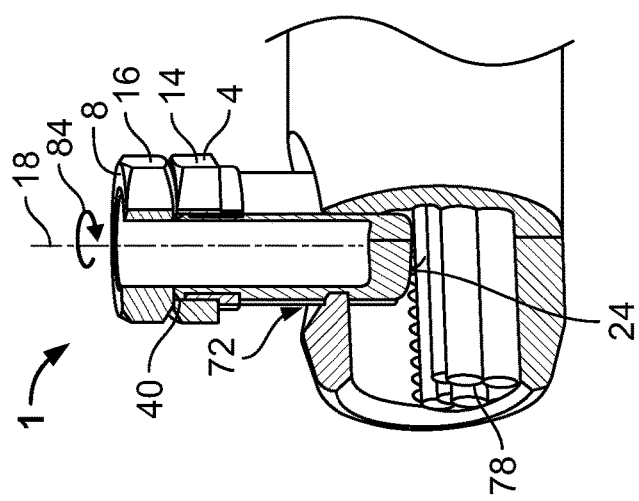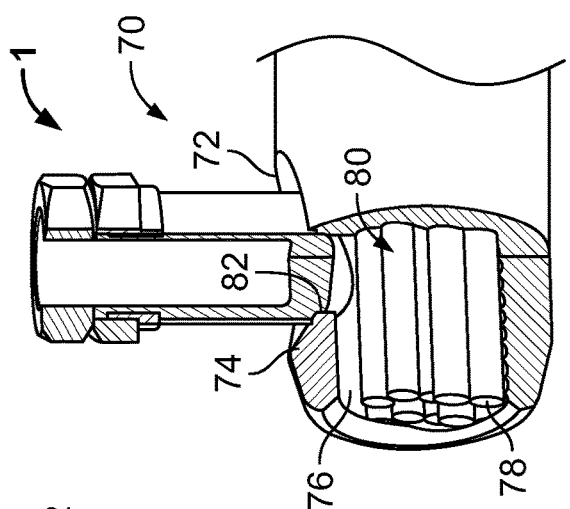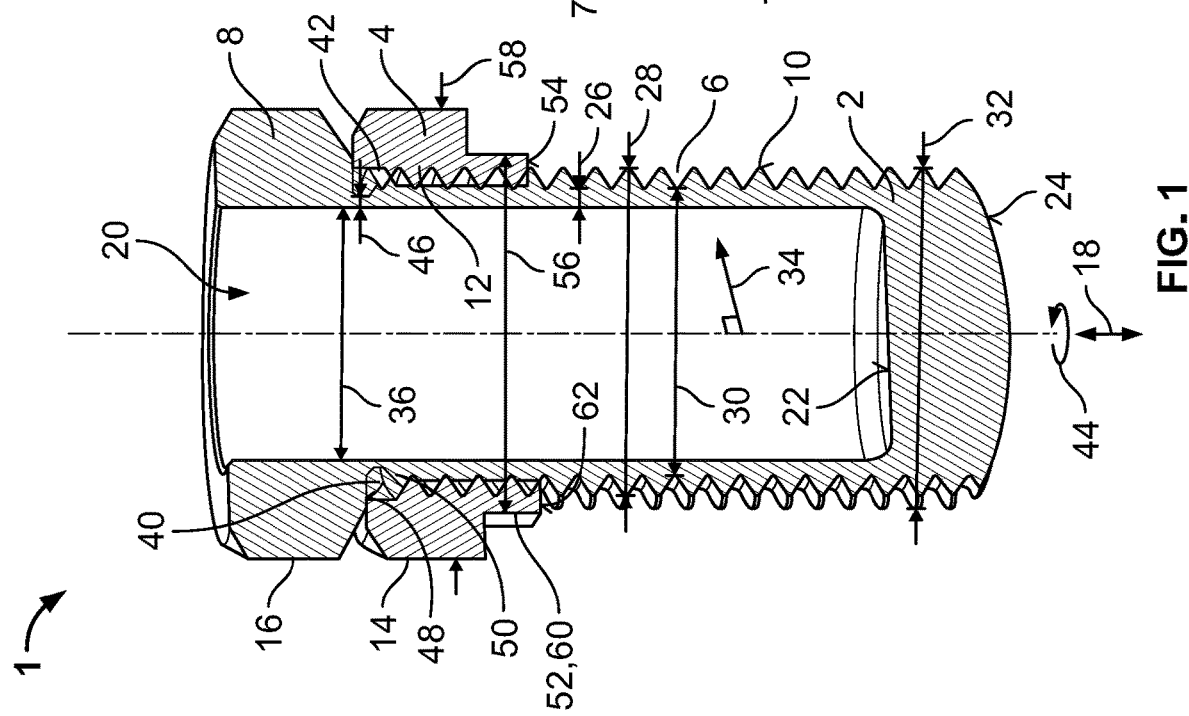

SHEARABLE FASTENER BOLT AND METHOD FOR CLAMPING ELECTRIC WIRES, AND ELECTRICAL CONNECTOR COMPRISING A ZERO-PROTRUSION SHEARABLE FASTENER

CROSS-REFERENCE TO RELATED APPLICATIONS

This application is a continuation of PCT International Application No. PCT/EP2018/059467, filed on Apr. 12, 2018, which claims priority under 35 U.S.C. § 119 to European Patent Application No. 17305443.8, filed on Apr. 13, 2017.

FIELD OF THE INVENTION

The present invention relates to a fastener bolt and, more particularly, to a shearable fastener bolt for clamping electric wires.

BACKGROUND

In some electric connectors, strands of an electric wire are clamped by a fastener bolt. The fastener bolts are shearable; the bolts are designed to break if a predetermined fastening torque that is applied to a drive section of the fastener bolt is exceeded. One part of the broken fastener bolt remains in the threaded hole and continues to contact and hold the electric wire strands. The other part, including the head of the fastener bolt, is removed.

The shearable design of the fastener bolt serves two purposes. First, the design prevents the tightening torque from becoming too high or too low. If the fastening torque becomes too high, the wire and/or the connector may be damaged. If the tightening torque is too low, a bad contact between the electric wire strands and the connector, and insufficient fixation of the wire in the connector, may result. Second, the breaking of the fastener bolt prevents the fastener bolt from protruding from the connector, so that heat shrink tubing may be applied without being torn or damaged. Ideally, the broken fastener bolt only protrudes a very short length from the connector.

In European Patent Application No. 1911981 A2, a bolt is screwed into a shearable sleeve having an external thread and an axially varying wall thickness. Although this configuration reduces the protrusion of the sheared bolt, the actual location of the break cannot be predicted accurately. Moreover, the break may be located in the part, where the external thread of the sleeve is engaged. This may weaken the connection of the sleeve to the threaded hole.

Although the existing shearable fastener bolts provide a satisfactory solution, they suffer from drawbacks. The main drawback is that a zero protrusion cannot be guaranteed with the existing designs. Further, the tightening torque for electric stranded wires having a small diameter needs to be larger than for electric standard wires having a large diameter. Thus, a single predetermined breaking point is not useful if the fastener bolt and the connector have to be applied over a wide range of different wire diameters.

SUMMARY

A fastener bolt for clamping an electric wire includes a bolt part and a nut part. The bolt part has a head section, a thread section, and a shearing section connecting the head section and the thread section. The nut part is screwed onto the thread section. The shearing section is configured to break if a predetermined fastening torque is exceeded. The thread section is hollow and has a predetermined tensile breaking strength.

BRIEF DESCRIPTION OF THE DRAWINGS

The invention will now be described by way of example with reference to the accompanying Figures, of which:

FIG. 1 is a sectional front view of a fastener bolt according to an embodiment;

FIG. 2 is a sectional perspective view of an electrical connector including the fastener bolt in a first operational state;

FIG. 3 is a sectional perspective view of the electrical connector in a second operational state;

DETAILED DESCRIPTION OF THE EMBODIMENT(S)

Figure 6:
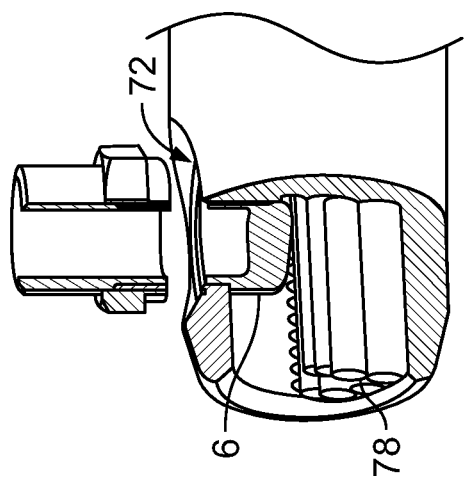
FIG. 6 is a sectional perspective view of the electrical connector in a fifth operational state.

Embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the disclosure will convey the concept of the invention to those skilled in the art.

A fastener bolt 1 according to an embodiment is shown in FIG. 1. The fastener bolt 1 comprises a bolt part 2 and a nut part 4. The nut part 4 can be screwed onto a thread section 6 of the bolt part 2, until the nut part 4 rests against a head section 8 of the bolt part 2. The thread section 6 has an external thread 10. The nut part 4 has an internal thread 12 that matches the external thread 10.

The nut part 4, as shown in FIG. 1, has an nut external drive section 14, such as an external hex or square. The head section 8 has a head external drive section 16 which, in an embodiment, is identical to the nut external drive section 14. If the nut part 4 is moved in an axial direction 18 against the head section 8, the drive sections 14, 16 are aligned. This is achieved by the external thread 10 which accounts for the dimensions of the nut part 4.

The bolt part 2, as shown in FIG. 1, has a blind hole 20. As shown in FIG. 1, the blind hole 20 extends through the head section 8 into the thread section 6 coaxially to the axial direction 18. A bottom 22 of the blind hole 20 is located between one and five thread pitches of the external thread 10 in the axial direction 18 spaced apart from a bottom 24 of the thread section 6 opposite the head section 8. The bottom 24 of the thread section 6 may be convex, i.e. having a dome shape and may, generally, have any appropriate shape depending on the particular application. In another embodiment, the blind hole 20 may extend through the bottom 24 of the thread section 6. In another embodiment, the bolt 1 may be hollow, i.e. sleeve-like; in this case a through hole is provided. The thread section 6 may have a thread cut that, in each of a plurality of fastener screws, starts at a same angular position with respect to the head external drive section 16.

As shown in FIG. 1, the blind hole 20 leaves a wall thickness 26 in the thread section 6 that is configured to withstand a predetermined tensile breaking stress; the thread section 6 has a tensile break strength which is determined by the wall thickness 26. In this respect, it is not important whether the wall thickness 26 is measured at a pitch diameter 28 of the thread 10 or at a minor diameter 30 or a major diameter 32 of the thread 10. Independently of the thread geometry, the predetermined tensile break strength is obtained within given tolerances. The wall thickness 26 is measured in a radial direction 34 and determined by the diameter 36 of the blind hole 20. In an embodiment, the wall thickness 26 in the thread section 6 varies in the axial direction 18 and, in an embodiment, varies linearly; in this embodiment, the blind hole 20 is conical. In an embodiment, the resting area 86 may have a width in the radial direction 34 in the range of 1 mm to 3 mm.

The bolt part 2, as shown in FIG. 1, has a shearing section 40. In the shown embodiment, the shearing section 40 is a groove 42 which is continuous in a circumferential direction 44 around the axial direction 18. A wall thickness 46 of the bolt part 2 underneath a bottom of the groove 42 in the radial direction 34 is smaller than the wall thickness 26 in the thread section 6. In the shearing section 40, a breaking resistance of the bolt part 2 against shear stress is reduced as compared to its immediate surroundings. The shearing section 40 is arranged between the thread section 6 and the head section 8. A bottom surface 48 of the head section 8 facing towards the thread section 6 in the axial direction 18, in an embodiment, continues seamlessly as a wall of the groove 42.

As shown in FIG. 1, a shoulder 50 is arranged between the shearing section 40 and the thread section 6. The shoulder 50 does not have a thread and, in the shown embodiment, has a diameter which is larger than the minor diameter 30 of the thread 10.

The shearing section 40 is designed to have a predetermined shear breaking strength. If the shear breaking strength is exceeded, the bolt part 2 will break at the shearing section. This will happen if a fastening torque which is applied to the drive section 16 of the head section 8 exceeds a predetermined value.

The nut part 4, as shown in FIG. 1, has a protrusion 52 that protrudes from a bottom surface in the axial direction 18. An outer diameter 56 of the protrusion 52 is smaller than an outer diameter 58 of the drive section 14. The protrusion 52 may be a ring-shaped collar 60. The internal thread 12 of the nut part 4 may continue on the protrusion 52. A bottom 62 facing in the axial direction 18 away from the head section 8, in an embodiment, is planar and perpendicular to the axial direction 18.

An electric connector 70, shown in FIG. 2, comprises the fastener bolt 1 screwed into a threaded hole 72 in a wall 74 of the connector 70. The connector 70 has a receptacle 76 for receiving at least one or, as shown, a plurality of wire strands 78 of a stranded electric wire 80 from which electric insulation has been removed.

In the shown embodiment, the receptacle 76 is a circular opening which is surrounded by the wall 74. In other embodiments, for example, the receptacle 76 may have a polygonal and/or generally rounded cross-section. Further, a separate wall may be situated opposite the wall 74.

The fastener bolt 1 is tightened against the wire strand 78 so that both a tight mechanical and tight electric connection between the wire strand 78 and the connector 70 is generated, as will be described in greater detail with reference to FIGS. 3-7. The threads 10, 12 as well as an internal thread 82 of the threaded hole 72 are not shown in FIGS. 3-7 for simplicity.

In order to press the bottom 24 fastener bolt 1 against the at least one wire strand 78, a fastening torque 84, shown in FIG. 3, is generated around the axial direction 18 by e.g. a tool which engages the drive section 16 of the head section 8. In an embodiment, the tool engages both the head drive section 16 and the nut drive section 14 simultaneously.

The fastening torque 84 drives the fastener bolt 1 into the receptacle 76 against the at least one wire strand 78, as shown in FIG. 3. Once the bottom 24 of the fastener bolt 1 rests against the at least one wire strand 78, pressure exerted on the at least one wire strand 78 is increased by increasing the fastening torque 84. If more than one wire strand 78 is provided, increasing the pressure compresses the single wire strand 78 and eliminates gaps between the individual strands 78, thus decreasing any transitional electric resistances and effecting tighter mechanical connection.

Figure 4:
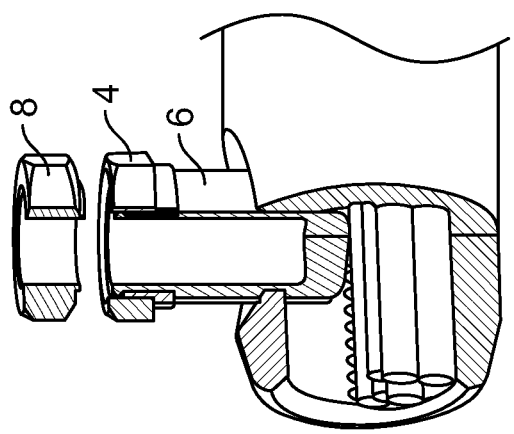
FIG. 4 is a sectional perspective view of the electrical connector in a third operational state.

The fastening torque 84 works against the resistance both in the threaded hole 72 as well as the resistance of the at least one wire strand 78 against elastic and plastic deformation. At one point during the further tightening of the fastener bolt 1, the predetermined fastening torque and the predetermined shear breaking strength at the shearing section 40 will be exceeded. If this happens, the head section 8 separates from the thread section 6 along the shearing section 40. The nut part 4 remains on the thread section 6, as shown in FIG. 4.

Figure 5:
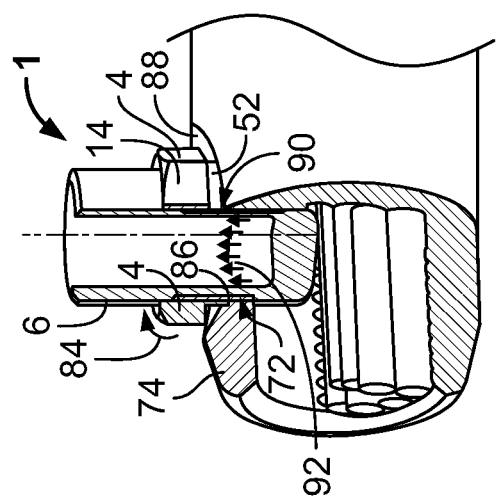
FIG. 5 is a sectional perspective view of the electrical connector in a fourth operational state.
Figure 7:
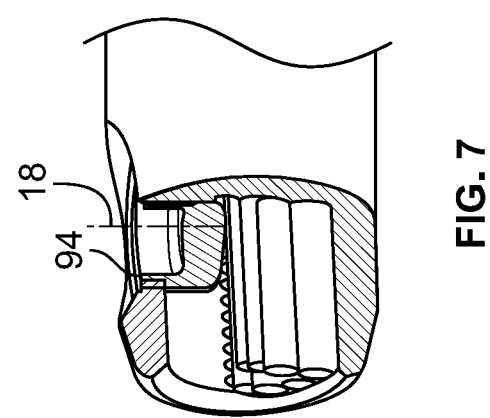
FIG. 7 is a sectional perspective view of the electrical connector in a sixth operational state.

The next steps, shown in FIGS. 5-7, are performed to break the thread section 6 as close as possible above the threaded hole 72.

Once the head section 8 has broken off, as shown in FIG. 5, the nut part 4 is tightened against the wall 74. The protrusion 52 comes to rest against a resting area 86 which surrounds the threaded hole 72 on the side of the wall 74 facing away from the receptacle 76 and/or facing the fastener bolt 1. The resting area 86, in various embodiments, may be planar and/or annular. The resting area 86 is shaped complementary to the bottom 62 of the protrusion 52.

The threaded hole 72 and/or the resting area 86, as shown in FIG. 5, may be surrounded by a depression 88 which can be trough-like and have a concave cross-section in a cut parallel to the axial direction 18.

By increasing the fastening torque 84, e.g. by applying a tool on the drive section 14 of the nut part 4, tensile stresses 92, shown in FIG. 5, are generated in the small gap 90 between the internal thread 82 of the threaded hole 72 and the internal thread 12 of the nut part 4. If the tensile stress 92 in the gap 90 exceeds the predetermined tensile breaking strength of the thread section 6, the thread section 6 will break. The break occurs in the gap 90, i.e. just above the threaded hole 70, in a root of the external thread 10. A part of the thread section 6 remains in the threaded hole 72 and still presses against the at least one wire strand 78, as shown in FIG. 6. A cap (not shown) made from rubber or resin may be inserted into the blind hole to seal it. The threaded hole 72 may terminate in an unthreaded section on a side facing away from the receptacle 76.

Because the break 94 follows the pitch of the thread 10, and the gap 90 has a maximum length in the axial direction 18 of less than one pitch of the thread 10, the break 94 will not protrude in the axial direction 18 for more than two thread pitches, as shown in FIG. 7. This height may be covered by the depression 88 so that heat shrink tubes will not be damaged by any potentially sharp edges of the break 94. Further, injuries due to any sharp edges may also be prevented.

Figure 8:
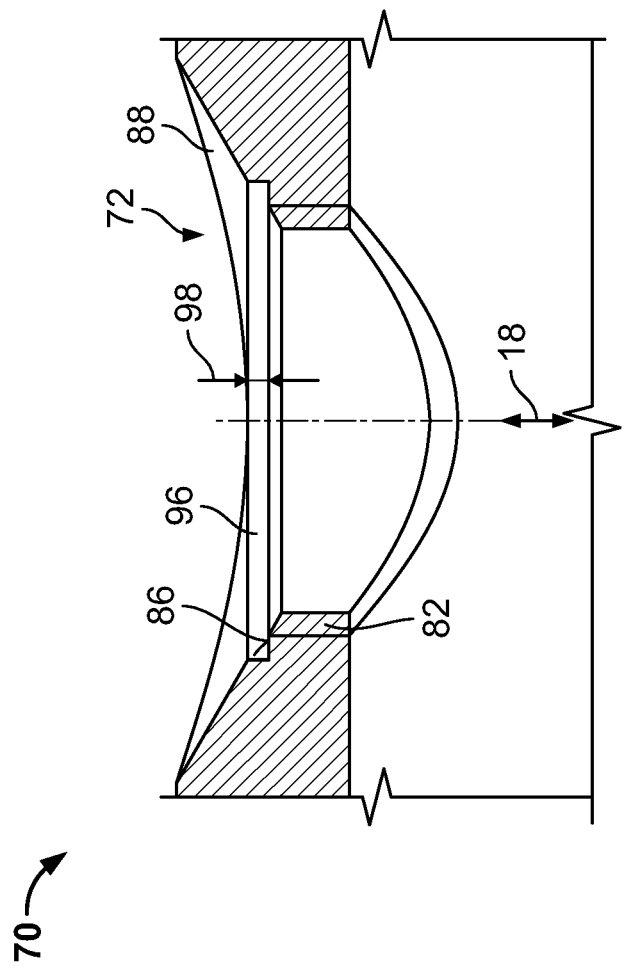
FIG. 8 is a sectional side view of a threaded hole of the electric connector.

As shown in FIG. 8, the annular resting area 86 is shaped complementary to the bottom 62 of the protrusion 52 and is surrounded by a ring-like shoulder 96 which protrudes away from the threaded hole 72 in the axial direction 18. A height 98 of the shoulder 96 in the axial direction 18 is at least one thread pitch and is less than two thread pitches. In an embodiment, the height 98 is around 1.5 thread pitches. This ensures that the break 94 is shielded radially by the shoulder 96 which forms a protective wall around the break 94. The trough-like depression 88 may surround the resting area 86 and the shoulder 96.

Using the combination of protrusion 52 or collar 60, respectively, and the resting area 86, the depression 88 can be shallow so that the connector 70 may remain compact. Further, by having only a small contact surface between the nut part 4 and the wall 74, frictional forces are low and thus, the fastening torque 84 is efficiently translated into tensile stress 92. This allows breaking the thread section 6 without the need of excessive manual force. To decrease the manual force for tightening the nut part 4, one of a bottom surface 54 of the nut 4 and the resting area 86 has one or more axial protrusions which extend over only a part of the circumference of the threaded hole 72 or the nut part 4 to further reduce the contact area.

The break 94 will follow the pitch of the thread 10. In particular, the break 94 will be generated in a root 100 shown in FIG. 9, i.e. in a valley of the thread 10. It will then follow the root 100 for about one complete turn and then cross the crest 102 of the thread 10 to join with the starting point of the break in the root 100 which is axially adjacent to the break. The crossing of the crest 102 has a high likelihood of generating a sharp edge and thus should take place at a shallow angle.

Figure 10:
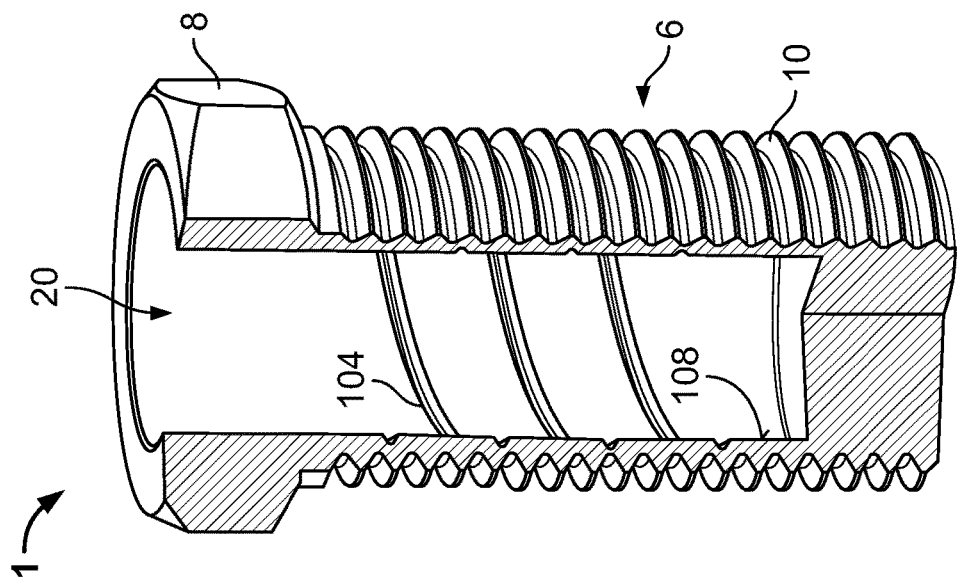
FIG. 10 is a sectional perspective view of a fastener bolt according to another embodiment.
Figure 9:
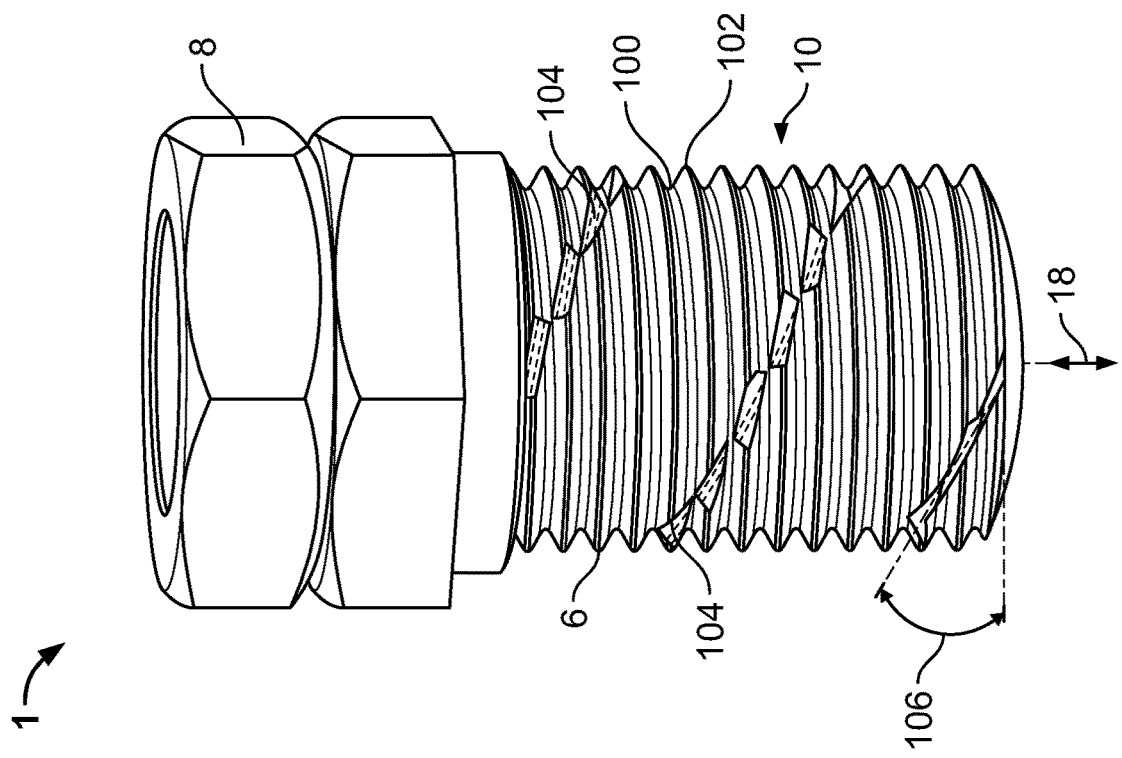
FIG. 9 is a perspective view of a fastener bolt according to another embodiment.

To guide the break 94 across the crest 102 of the thread 10, at least one breakage line 104 may be provided, as shown in FIGS. 9 and 10. The breakage line 104 is slanted both with respect to the pitch of the thread 10 and with respect to the axial direction 18. The breakage line 104 is a line-like weakening of the tensile break strength of the thread section 6. The breakage line 104, in an embodiment, is limited to the crest 102. In an embodiment, the breakage line 104 is a groove which extends across the crest 102 from one neighboring root 100 to the axially adjacent root 100. The breakage line 104 may in particular be a groove or a series of aligned grooves. The depth of the grooves may correspond to the depth of the root 100 of the thread 10, so that the wall thickness 26 of the thread section 6 is the same in the breakage line 104 as in the roots 100. Of course, in other embodiments, the breakage line 104 may also be shallower than a root 100 or deeper. The breakage line 104 may extend over a whole length of the thread section 6 or, in another embodiment, can be limited to only a part of the thread section 6.

As shown in FIG. 9, the at least one breakage line 104 may be helical. The handedness of the helix of the breakage line 104 may be opposite to the handedness of the thread 10. An angle 106 between the breakage line 104 and a crest 102, in an embodiment, is less than 50° and, in another embodiment, is less than 30°. The angle 106 is measured at the crossing of the breakage line 104 and a crest 102 in the quadrant facing in the turning sense of the screw-in direction and towards the head section 8 of the fastener bolt 1.

To reduce the height of the break 94 above the threaded hole 72, for every 360° turn of a crest 102, there are at least two crossings of a breakage line 104. For example, two or more helical breakage lines 104 may be provided. The pitch of the breakage line 104 is higher by an integer factor than the pitch of the thread 10. In an embodiment, the breakage line 104 is a series of linearly aligned grooves.

The fastener bolt 1 of FIG. 10 differs from the one shown in FIG. 9 in that the at least one breakage line 104 is located on an inner wall 108 of the thread section 6. The inner wall 108 may be formed by the through or blind hole 20. The layout of the at least one breakage line 104 may be the same as the layout of the breakage line 104 of FIG. 9, i.e. the breakage line 104 may wind helically around the inner wall 108 and have a handedness which is opposite to the handedness of the external thread 10. Moreover, the pitch of the breakage line 104 may be larger than the pitch of the external thread 6. In particular, the pitch of the breakage line 104 in any embodiment may be between two and five times the pitch of the external thread 6, for example, as shown in FIG. 10, three times the pitch of the external thread 6. If the breakage line 104 is located on the inner wall 108, it is configured as a continuous groove having a V-shaped cross-section.

What is claimed is:

1. A fastener bolt for clamping an electric wire, comprising:
 a bolt part having a head section, a thread section, and a shearing section connecting the head section and the thread section, the shearing section is configured to break if a predetermined fastening torque is exceeded, the thread section is hollow and has a predetermined tensile breaking strength, the thread section has a breakage line along which the thread section is weakened, the breakage line extends slanted with respect to an external thread of the thread section and to an axial direction and extends helically in a direction opposite to a direction of the external thread, a pitch of the breakage line is larger than a pitch of the external thread; and
 a nut part screwed onto the thread section.

2. The fastener bolt of claim 1, wherein a blind hole extends through a portion of the thread section that is hollow.

3. The fastener bolt of claim 1, wherein the shearing section has a groove extending circumferentially around the shearing section.

4. The fastener bolt of claim 1, wherein the head section has a head external drive section and the nut part has a nut external drive section.

5. The fastener bolt of claim 4, wherein head external drive section and the nut external drive section are aligned when the nut part abuts the head section.

6. The fastener bolt of claim 4, wherein the nut part has a protrusion protruding in an axial direction from a bottom surface of the nut part.

7. The fastener bolt of claim 6, wherein the protrusion is a ring-shaped collar extending along the axial direction.

8. The fastener bolt of claim 7, wherein the protrusion has a smaller outer diameter than the nut external drive section.

9. The fastener bolt of claim 1, wherein the breakage line extends across a crest of the external thread.

* * * * *